United States Patent
Meidan et al.

(10) Patent No.: US 9,253,453 B2
(45) Date of Patent: Feb. 2, 2016

(54) AUTOMATIC VIDEO SURVEILLANCE SYSTEM AND METHOD

(75) Inventors: Avi Meidan, Caesaria (IL); Ran Bar Sella, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 414 days.

(21) Appl. No.: 13/381,177

(22) PCT Filed: Jun. 13, 2010

(86) PCT No.: PCT/IL2010/000465
§ 371 (c)(1),
(2), (4) Date: Dec. 28, 2011

(87) PCT Pub. No.: WO2011/004358
PCT Pub. Date: Jan. 13, 2011

(65) Prior Publication Data
US 2012/0105634 A1    May 3, 2012

(30) Foreign Application Priority Data
Jul. 8, 2009    (IL) .......................................... 199763

(51) Int. Cl.
*H04N 7/18* (2006.01)
*G08B 13/196* (2006.01)

(52) U.S. Cl.
CPC ............. *H04N 7/185* (2013.01); *G08B 13/1965* (2013.01); *G08B 13/19652* (2013.01); *G08B 13/19689* (2013.01)

(58) Field of Classification Search
CPC ...................... G08B 13/1965; G08B 13/19652; G08B 13/19689; H04N 7/185
USPC .......................................................... 348/143
See application file for complete search history.

(56) References Cited

U.S. PATENT DOCUMENTS

| | | | |
|---|---|---|---|
| 2006/0077255 A1 | 4/2006 | Cheng | |
| 2006/0238617 A1 | 10/2006 | Tamir | |
| 2007/0126867 A1 | 6/2007 | McCutchen | |
| 2009/0015674 A1 | 1/2009 | Alley et al. | |
| 2009/0214079 A1* | 8/2009 | Hamza et al. | 382/103 |
| 2012/0092503 A1* | 4/2012 | Cheng | 348/159 |

FOREIGN PATENT DOCUMENTS

| | | |
|---|---|---|
| EP | 1455525 A1 | 9/2004 |
| WO | 2006067547 A1 | 6/2006 |
| WO | 2008032325 A2 | 3/2008 |

* cited by examiner

*Primary Examiner* — Gelek W Topgyal
(74) *Attorney, Agent, or Firm* — Pearl Cohen Zedek Latzer Baratz LLP (57) ABSTRACT

Apparatus and method for automatic surveillance of a monitored area having one or more regions of interest using a video imaging device are disclosed. The method includes receiving data defining said one or more regions of interest and one or more characteristics of an object of interest; pointing the line of sight of the imaging device at a region of interest selected from said one or more regions of interest; automatically scanning the selected region of interest to detect said one or more characteristics of the object of interest and upon detection issuing an alert; and when said one or more regions of interest includes more than one region of interest, repeating the steps of pointing the line of sight of the imaging device and automatically scanning in a predetermined order of viewing of the regions of interest, and upon detection of said one or more characteristics of the object of interest issuing an alert, for each of the regions of interests.

21 Claims, 4 Drawing Sheets

AUTOMATIC VIDEO SURVEILLANCE SYSTEM AND METHOD

FIELD OF THE INVENTION

The present invention relates to video surveillance. More particularly, the present invention relates to an automatic video surveillance system and method.

BACKGROUND OF THE INVENTION

In order to monitor extended areas, or to acquire reconnaissance data, a video imaging device (hereinafter—video camera) may be mounted on an elevated platform. The platform may be a piloted aircraft, an unmanned aerial vehicle (UAV), a free-flying dirigible, a tethered balloon, a tower, or any other elevated platform on which a video camera may be mounted. When topographical or other conditions permit, the platform may also be a manned or unmanned ground vehicle, boat, or any other type of platform that is not elevated. The video camera may be any imaging device capable of providing a continuous or truncated video feed, such as, for example, a video camera recording a series of successive frames, or a video camera recording individual frames at intervals. The video camera may acquire images formed by visible light, infrared radiation, or by radiation in any other spectral range. The video camera may transmit the acquired image data to a remote, or local, receiver and display.

At any given moment, the video camera may acquire an image of a scene within the monitored area that falls within the field of view (FOV) of the video camera. The video camera is described as pointing at that scene. The video camera FOV is limited by characteristics of the video camera structure and its optics. In order to acquire an image of a different scene within the monitored area, the video camera is reoriented so as to point at that different scene. The different scene then falls within the video camera FOV. For this reason, the video camera is mounted in such a manner as to allow its orientation in any of a wide range of directions. Often the orientation of a video camera is defined by its pan and tilt angles, or by the direction of its line of sight (LOS).

A video camera operator at a remote location operates the video camera by means of a remote-control console. Alternatively, the video camera may be operated by an automated system. The video camera operator also views the video camera image output on a display associated with the remote-control console. In general, the video camera operator points the video camera at various scenes that require monitoring. Examples of such regions include roads, borders, areas surrounding places of business, forested areas and other areas of interest. The video camera operator views video camera output images to monitor those scenes. While monitoring the scene, the video camera operator may identify a feature in an output image of the scene that requires further attention. The video camera operator may also be able to distinguish between areas where a certain type of feature would require further attention, and other areas where such a feature would not raise interest. For example, vehicle traffic close to a border or in the parking lot of a business that is closed for the night may require further attention, whereas vehicle traffic on an intercity road may not. A vehicle traveling at high speed on a road with a maximum speed limit may require further attention, while a vehicle traveling at similar speed on a road with a different speed limit may not. Similarly, a fire in a forested area or covering a wide area may require further attention, while a fire covering a small area in a designated campground may not. Further attention to a feature may include further examination of that feature via the remote video camera by pointing the video camera at that feature for an extended period of time, or sending an observer to observe the feature from close range.

In general, operating a video surveillance system is a tiresome and eye-straining task. When operating a video camera, a human operator is constantly looking for objects of interest, and must gaze at the monitor for a lengthy period of time. The operator often must search for features with in the display to verify that the video camera is indeed aimed at the intended scene or region of interest. In general, in the absence of obvious and unambiguous visual cues, such verification may be tedious and time-consuming.

When a monitored area is substantially larger than the FOV of the video camera, the operator must also redirect and point the LOS of the video camera at various locations within the monitored area. These locations may cover the entire monitored area or may include separate isolated regions of interest.

Alternatively, the video camera pointing may be controlled by an automated system. Automated video camera pointing systems are generally based on simple, repetitive motions. For example, in a pushbroom system, the video camera is pointed in a fixed direction while the motion of the platform causes the field of view (FOV) of the video camera to scan across the monitored area parallel to the direction of motion of the platform. In a sweeping system, the video camera is caused to periodically rotate sideways, sweeping laterally across the direction of motion of the platform. With such automated systems, the coverage of the monitored area by the video camera FOV is not related to the necessity or interest in covering the area. Thus, use of such systems may result in inefficient use of time, by spending much of the time monitoring regions of little or no interest.

Continued monitoring of similar or repeated scenes tends to be a tedious and monotonous task for a human operator. In general, features that require further attention are relatively uncommon, so that monitoring of the scenes may fail to hold the operator's attention after a period of time. The operator may become fatigued and less alert and, as a result, may fail to point the video camera at a scene that requires monitoring. A fatigued operator may fail to identify a feature requiring further attention. Furthermore, in images of complex scenes, or of scenes that are viewed intermittently, an operator may have difficulty detecting slowly or evolving or instantaneous changes or small changes that might require further attention. Furthermore, as scanning tasks typically include monitoring of several, dislocated, scenes, the operator is also required to manage the scanning tasks and redirect the LOS of the video camera from scene to scene in order to monitor all the required locations following a pre-defined re-visiting schedule. As the operator fatigue is increased, his ability to monitor all the different areas in an efficient manner substantially decreases over time.

Therefore, there is a need for a system that automates the remote monitoring process, automatically and efficiently pointing the LOS of the video camera at regions of interest, assisting the operator in finding and detecting those features in the monitored areas that require further attention.

It is an object of the present invention to provide an automatic surveillance system and method that may assist a video camera operator by automating the pointing of a video camera that is mounted on a UAV or other platform. It is a further object of the present invention to assist the operator by automating the detection of features in the video camera output that require further attention.

Other objects and advantages of the present invention will become apparent after reading the present specification and reviewing the accompanying drawings.

SUMMARY OF THE INVENTION

There is thus provided, in accordance with some embodiments of the present invention, a method for automatic surveillance of a monitored area having one or more regions of interest using a video imaging device, the method comprising:

receiving data defining said one or more regions of interest and one or more characteristics of an object of interest;

pointing the line of sight of the imaging device at a region of interest selected from said one or more regions of interest;

automatically scanning the selected region of interest to detect said one or more characteristics of the object of interest and upon detection issuing an alert; and when said one or more regions of interest includes more than one region of interest, repeating the steps of pointing the line of sight of the imaging device and automatically scanning in an automatically determined order of viewing of the regions of interest, and upon detection of said one or more characteristics of the object of interest issuing an alert, for each of the regions of interests.

Furthermore, in accordance with some embodiments of the present invention, the predetermined order of viewing is optimized.

Furthermore, in accordance with some embodiments of the present invention, the imaging device comprises a video camera.

Furthermore, in accordance with some embodiments of the present invention, the step of automatically scanning the selected region of interest to detect said one or more characteristics of the object of interest comprise video motion detection.

Furthermore, in accordance with some embodiments of the present invention, the step of automatically scanning the selected region of interest to detect said one or more characteristics of the object of interest comprises constructing a stitched image of the region of interest.

Furthermore, in accordance with some embodiments of the present invention, said one or more characteristics of the object of interest is selected from a group of object characteristics which consists of: shape, dimensions, texture, color, luminance, orientation, location, relative location to other known objects, detection of motion, direction of motion and speed.

Furthermore, in accordance with some embodiments of the present invention, the alert is selected from a group of alerts that consists of: displaying a still image of the detected object, pointing the line of site of the imaging device at the object of interest, marking the detected object on a displayed image.

Furthermore, in accordance with some embodiments of the present invention, the imaging device is mounted on an elevated platform.

Furthermore, in accordance with some embodiments of the present invention, the platform comprises a platform selected from a group of platforms consisting of an unmanned aerial vehicle, a manned aircraft, a tower, a post, a tethered balloon.

Furthermore, in accordance with some embodiments of the present invention, the step of automatically scanning the selected region of interest is performed on the platform.

Furthermore, in accordance with some embodiments of the present invention, there is provided an apparatus for automatic surveillance of a monitored area having one or more regions of interest, the apparatus comprising:

a video imaging device;

a platform adapted to pointing the video imaging device; and a processor adapted to receive location data of said one or more regions of interest and one or more characteristics of an object of interest, point the line of sight of the imaging device at a region of interest selected from said one or more regions of interest, automatically scan the selected region of interest to detect said one or more characteristics of the object of interest and upon detection issue an alert, and if said one or more regions of interest includes more than one region of interest, point the line of sight of the imaging device and automatically scan in an automatically determined order of viewing of the regions of interest, and upon detection of said one or more characteristics of the object of interest issue an alert, for each of the regions of interests.

Furthermore, in accordance with some embodiments of the present invention, the predetermined order of viewing is optimized.

Furthermore, in accordance with some embodiments of the present invention, the imaging device comprises a video camera.

Furthermore, in accordance with some embodiments of the present invention, the processor is adapted to automatically scan the selected region of interest to detect said one or more characteristics of the object of interest using video motion detection.

Furthermore, in accordance with some embodiments of the present invention, the processor is adapted to construct a stitched image of the region of interest.

Furthermore, in accordance with some embodiments of the present invention, said one or more characteristics of the object of interest is selected from a group of object characteristics which consists of: shape, dimensions, texture, color, luminance, orientation, location, relative location to other known objects, detection of motion, direction of motion and speed.

Furthermore, in accordance with some embodiments of the present invention, the alert is selected from a group of alerts that consists of: displaying a still image of the detected object, pointing the line of site of the imaging device at the object of interest, marking the detected object on a displayed image.

Furthermore, in accordance with some embodiments of the present invention, the imaging device is mounted on an elevated platform.

Furthermore, in accordance with some embodiments of the present invention, the platform comprises a platform selected from a group of platforms consisting of an unmanned aerial vehicle, a manned aircraft, a tower, a post, a tethered balloon.

Furthermore, in accordance with some embodiments of the present invention, a component of the processor that is adapted to automatically scan the selected region of interest to detect said one or more characteristics of the object of interest and upon detection issue an alert is mounted on the platform.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

In accordance with embodiments of the present invention, an automatic video camera-pointing system and method are provided to assist a remote operator of a video camera or other imaging device in the task of monitoring. It is assumed that one or more video cameras are mounted on a platform from which each video camera may, jointly or separately, be pointed at various scenes. The video camera transmits video or image data to a remote console monitored by a video camera operator.

The platform may be stationary, such as a tower, post, or tethered balloon, or may be mobile, such as an unmanned aerial vehicle (UAV) or dirigible, or a manned aircraft. The path followed by a mobile platform may be pre-determined, and not under the continuous control of the video camera operator during its flight.

An automatic video surveillance system, according to embodiments of the present invention is used in monitoring a designated area to be monitored. The monitored area includes one or more regions of interest, each of which is to be viewed by the automatic surveillance system.

Location information, viewing information and other parameters and constraints are input into the system. The viewing parameters include, inter alia, characteristics of objects of interest, which are to be detected and identified. According to embodiments of the present invention, an automatic video surveillance system includes automatic detection of objects whose characteristics match the characteristics of the objects of interest.

When viewing a region of interest that is larger that the area covered by the camera FOV, the camera LOS is redirected so as to scan the region of interest. The scanning is carried out in a predetermined manner. The predetermined manner of scanning may depend on such factors as, for example, the capabilities of the camera pointing system (such as limits on a system of gimbals) and the shape of the region of interest. The manner of scanning may be selected so as to optimize the scanning time and to ensure that the entire area of the region of interest is imaged.

The predetermined manner of scanning may be calculated at the beginning of a task, mission, or flight on the basis of data input by an operator prior to or near the beginning of the mission. The predetermined manner of scanning may be modified during the course of the mission on the basis of updated data provided by an operator, or autonomously on the basis of changing conditions such as a change in the relative locations of the platform and a region of interest, detected changes in a target, or identification of an event.

The camera FOV covers a scene within the region of interest. The scene is scanned and video data is processed by a video processing unit, which is a part of the system, in order to detect objects of interest.

Once an object of interest or an event of interest is detected, the system may issue an alert. An alert may include any method of notifying an operator or another system or system module, including, for example, generating a visible or audible alarm, displaying or transmitting information regarding the object of interest including the time of detection and location of the object, display or transmission of a still image with the detected object (preferably marked or otherwise distinctly indicated on the image), or a video feed clip of the scene with the detected object. Information may be displayed on the main monitor screen or on another screen. The operator may then examine the detected object and identify whether it is indeed an object of interest requiring further attention or appropriate action.

The platform of an automatic video surveillance system, in accordance with embodiments of the present invention, may be provided with the processing capability to detect events using on-board capabilities. With such a platform, the platform may include components of a processor that are configured to transmit data to a remote console only when an object of interest is detected. With such a configuration, data may be transmitted from the platform to the remote console intermittently, and not continuously. Since data is not transmitted continuously, the communications resources between the platform and the remote console may be utilized more efficiently and may be capable of accommodating communications between additional platforms.

The automated detection may utilize known image processing techniques of identifying objects in an image which is based on identifying simple characteristics (for example, shape, dimensions, orientation, texture, brightness or luminance, color), or more complex characteristics (such as, for example, location, relative location to other known objects, detection of motion, direction of motion, speed), and thus greatly decreasing the possibility of the operator overlooking an object of interest.

An automatic video surveillance system according to embodiments of the present invention determines the order of viewing of the regions of interest and other viewing terms, based on the input information. Constraints may include maintaining minimal angle of viewing, minimal period of time for viewing a scene and other constraints.

The inputs parameters may be provided to the system using a remote control console. Such parameters may include definition of the locations and boundaries of the areas of interest that are to be monitored, criteria that define the frequency or the period of time with which each area of interest is to be monitored, optimization criteria, and criteria.

A graphical user interface may be used, by means of which a region of interest is graphically marked on a displayed map. Alternatively, geographical coordinates may be entered as numerical data. Parameters may also include a ranking or rating of the importance or priority of each scene. Parameters may also include the required resolution of the image of the scene, the frequency with which a scene is to be observed, or how long the scene must be observed. Parameters may also include optimization criteria and the flight path of a mobile platform. The parameters may either be entered by the operator or may be extracted from a stored data file that is selected by the operator.

On the basis of the input parameters, the system generates a series of instructions for pointing the video camera LOS. Instructions for pointing the video camera may include location information of the regions of interest within the monitored area, order if viewing the regions of interest, additional constraints, such as for example, viewing a specific region of interest at specific times or intervals, or other constraints or parameters. The camera pointing instructions are transmitted to the video camera platform. The video camera is pointed in accordance with the transmitted instructions.

An automatic video surveillance system according to embodiments of the present invention calculates a sequence in which to point the video camera successively at each of the regions of interest. The automatic video surveillance system automatically controls the orientation of the video camera in order to point the video camera at the region of interest. In the case of a mobile platform, the automatic video surveillance system utilizes navigation data regarding the geographic position and orientation of the platform with respect to the monitored area and the region of interests and video camera navigation data may be transmitted to the system by navigation instruments on the mobile platform to be take in account in calculating the pointing direction of the camera. On the basis of the relative positions of the video camera and the scene, the automatic video camera-pointing system calculates the elevation/depression and azimuth angles of the video camera line-of-sight (LOS) to the region of interest. The system may also calculate the required zoom of the video camera on the basis of the desired resolution and the distance from the video camera to the region of interest. The automatic video surveillance system according to embodiments of the present invention then transmits control commands to the video camera platform. In response to the control commands, the video camera line-of-sight (LOS) is adjusted so as to point the video camera at the defined region of interest.

An automatic video camera-pointing system according to embodiments of the present invention may utilize an optimization algorithm in determining the sequence of viewing the defined regions of interest. An optimization algorithm may take into account such parameters as the geographic locations of the various scenes, the flight path of an airborne platform, relative weighting of the importance of the various regions of interest, the amount of time for which each region of interest is to be observed, etc. Optimization may be defined as the maximization or minimization of a quantity or a combination of quantities. For example, the sequence may be determined so as to minimize the average change in LOS between regions of interest, thus maximizing the number of different regions of interest imaged in a given period of time. This would increase the efficiency of the monitoring, i.e. the fraction of time spent on moving the camera LOS between regions of interest. Other examples of optimization criteria may include: imaging each region of interest at a frequency related to the importance of that region of interest, minimizing changes in zoom from region to region, equalization of the coverage of different regions, or minimization of consumption of electrical power. An optimization algorithm may also take into account the visibility of a region from the current position of the video camera platform. For example, the algorithm may determine that a given region is not optimally visible from the current position of the video camera platform. For example, the LOS to the region may be far from the nadir (e.g. more than 30°), preventing sufficient visibility of objects in the region. In this case, in order to maximize the efficient utilization of imaging resources, the algorithm may skip imaging that region, or reduce the spent imaging that region, until the platform is in better viewing position.

The scene covered by the FOV of the video camera is typically smaller than the region of interest (ROI) that is to be observed. This may be especially true when the scene is to be observed with a high spatial resolution. In general, the angular size of the FOV of a video camera is reduced when spatial resolution increases. The automatic pointing system then calculates a sequence of LOS directions for the FOV. An optimized sequence enables the FOV of the video camera to automatically cover the entire ROI at the required resolution in a minimum amount of time.

An automatic video surveillance system according to embodiments of the present invention may be integrated with an automatic detection system. Such an automatic detection system may include video motion detection (VMD). An automatic detection system may require only a few frames of video images in order to automatically detect an object of interest, whereas a human operator is most likely to overlook this object if shown for such a short period of time, or need a substantially longer time to detect. At such high rate of detection the automatic video surveillance system may therefore point the video camera at a scene only as long as is necessary for the automatic detection system to operate properly on the scene. In this manner, several scenes may be imaged in an optimum manner, at frequent intervals in a minimal amount of time. A human operator, on the other hand, would have difficulty in accurately pointing the video camera in such an optimal manner. Optionally, the automatic video surveillance system may be configured to receive a signal from the automatic detection system that indicates that the scene has been imaged sufficiently for detection.

Pointing by the automatic video surveillance system is likely to be more accurate, reproducible, and quicker than a human video camera operator. Accurate and reproducible pointing of the video camera may result in increased similarity between two images of a given scene made at different times. Increased similarity may enable an automatic detection system to automatically compare images acquired at different times.

An automatic video surveillance system according to embodiments of the present invention at least partially relieves the video camera operator of the need to constantly adjust the pointing of the video camera in response to changing conditions, such as movement of a free-flying platform. It also reduces dependence on the ability of the video camera operator to accurately point the video camera at a scene, and to provide adequate coverage of the monitored area. Often, a scene to be observed may not be sufficiently distinguishable from surrounding areas to enable an operator to rapidly, accurately and reproducibly aim the video camera at the scene. Reducing dependence on the ability of the video camera operator reduces the likelihood that operator fatigue will adversely affect the observations. An automatic video surveillance system according to embodiments of the present invention, employed in conjunction with an automatic detection system, reduces the likelihood that operator fatigue will result in undetected features in the monitored area.

Embodiments of the present invention may further assist the operator by finding and identifying objects of interest or features in an image that require further attention. Features that require further attention may include, for example, objects in the image with particular size, shape, orientation, temperature, texture, luminance, or color. Features may also include movement of an object or other changes in the content of a scene. For example, such features may include a vehicle-sized object that is moving at a speed that exceeds a defined maximum, any vehicle moving in an area closed to vehicular traffic, or an area of high temperature in a forested area. Criteria for feature detection may include velocity, size, temperature, color, or shape. The system may employ image analysis software to analyze a transmitted image frame, or a set of successive frames in a video stream, and identify features that match the defined criteria. In response to identifying an object of interest, the system may mark the object of interest on an image and display that image to the operator. Feature marking may include, for example, highlighting the feature with false color, surrounding the feature with a displayed border, and displaying the values of one or more quantities that describe the feature. In addition, upon identification of a feature matching defined criteria, the system may issue an audible, visible or other form of alarm to alert the video camera operator to the feature. While an image displaying an object of interest is being displayed to the video camera operator, the system may continue to point the video camera at other points in the monitored area and continue checking for objects of interest. Alternatively, the system may continue to aim the video camera at the detected object of interest until otherwise instructed by the video camera operator.

Automatic feature detection is known and systems for automatic feature detection have been previously described. An automatic detection system may include video motion detection (VMD), which has been previously described. VMD automatically identifies motion in video images. Parameters, or a set of parameters, are input to the VMD system. The parameters define the types of motion that the VMD system is to detect. Such parameters may include the sizes of moving objects to be detected, ranges of speed, directions of motion, and regions of the monitored area to be included or excluded for VMD. For example, a monitored area may include a road carrying intercity traffic that is not of interest. In that case, the input parameters may exclude the road from the areas in which VMD is to be applied. In another example, input parameters may exclude the detection of motion that is parallel to a border, but may include motion whose direction is such as to intercept the border.

In general, VMD operates by comparing two or more successive acquired video frames of a given scene in order to detect differences between the frames indicative of motion. VMD then identifies those differences between the frames that correspond to the type of motion to be detected. Moving objects may be indicated on an image that is displayed to the operator. The display may also indicate the speed and direction of the motion.

The number of frames required to detect motion may depend on the nature of the motion, including its speed. Slower motion may require more frames to detect the motion. Therefore, the amount of time that the video camera is pointed at a scene should be appropriate to the type of motion, or other features, which is to be detected.

Automatic feature detection relieves the video camera operator from some of the necessity to pay constant attention to details of high-resolution images. In some cases, automatic feature detection may enable reducing the resolution of the acquired images. In some cases, an automatic detection system may detect features in images whose resolution is too low to enable a human observer to detect the same features. Reducing the required resolution enables the acquisition of images with lower resolution and wider FOV. Wider FOV images would allow for greater coverage of a scene and subsequently of a monitored area in a given period of time.

Figure 1:
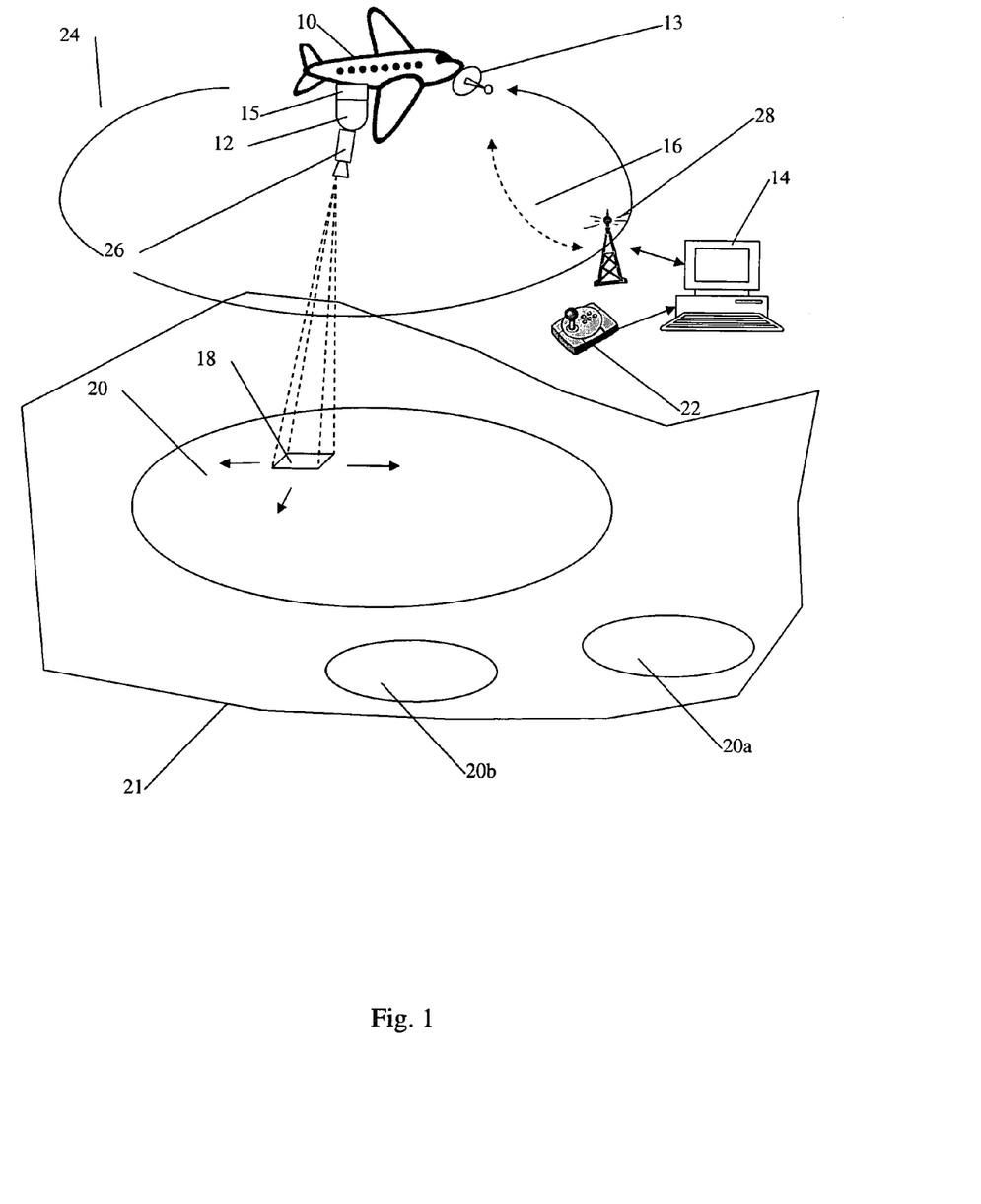
FIG. 1 is a schematic drawing of an automatic video surveillance system in accordance with embodiments of the present invention.

Reference is now made to the accompanying Figures. FIG. 1 is a schematic drawing of an automatic video surveillance system in accordance with embodiments of the present invention. The purpose of the system is to monitor objects and activity within monitored area 21. A video camera platform 10, for example a UAV flying along predetermined flight path 24, carries video camera payload 12. Alternatively, the video camera platform may be in the form of a piloted aircraft, free-flying dirigible flying along a predetermined path, a tethered balloon, a mast on a traveling or fixed vehicle, a fixed tower, a manned or unmanned ground vehicle, or any other platform capable of carrying a maneuverable mounted video camera or a video camera payload. Video camera payload 12 includes a video camera 26 that is mounted so as to enable pointing video camera 26 at regions of interest, such as scenes 20, 20a, and 20b, within monitored area 21. Video camera payload 12 may represent any remotely controlled video camera mounting and aiming system, whether or not associated with an airborne vehicle. Video camera 26 may represent one of several video cameras that may be pointed independently of one another. Video camera 26 may also represent a group of video cameras that are co-mounted so that all video cameras of the group are pointed at a single scene. At a given moment, video camera 26 is pointed toward an imaged scene 18. As the orientation of video camera 26 changes, the location of imaged area 18 changes. In the state illustrated in FIG. 1, imaged scene 18 falls within a region of interest 20. The size and shape of viewed imaged scene 18 corresponds to the FOV of video camera 26. Communications interface 13 is associated with video camera payload 12. Communications interface 13 receives remote control commands from, and transmits data and images to, remote receiver/transmitter unit 28 via communications link 16. Communications link 16 may include radio, microwave, optical or other wireless communications carriers, wire, optical fiber, or any other suitable medium for communication between remote devices. Also associated with video camera payload 12 may be navigation devices 15 for determining the geographic position and orientation of payload 12. Navigation devices may include, for example, a Global Positioning System (GPS) receiver, an inertial guidance system (INS), radar, compass, gyroscope, accelerometer, or altimeter, and any other device that may aid in determining the current position and course of payload 12.

Pointing and operation of video camera 26 is controlled by means of remote commands. Remote commands are issued by remote control console 14. Remote control console 14 may include several communicating devices. Such devices may include a digital computer with associated data storage and processing capability, data input devices, and a monitor for displaying image and other data. Remote commands may be generated by remote control console 14 either on the basis of programmed instructions, or on the basis of operator input to control unit 22. Control information may be input directly to remote control console 14. Input to control console 14 may be in the form of entered text or in the form of selection of an option from a menu. Remote control console 14 is communicates with receiver/transmitter unit 28. Receiver/transmitter unit 28 transmits control commands to video camera payload 12 via communications link 16. Video camera payload 12, in response a transmitted control command, may change the LOS of video camera 26 at an appropriate rate for an appropriate period of time. Changing the video camera 26 LOS moves the location of imaged scene 18. Video camera 26 acquires image data of viewed imaged scene 18. Video camera payload 12 transmits the acquired image data via communications link 16 to receiver/transmitter unit 28 that communicates with remote control console 14. Remote control console 14 then displays the acquired data as an image, which may be viewed by the video camera operator. Prior to displaying the acquired data, remote control console 14, or a processor located at another location, may process the acquired data. Such processing may include automatic feature detection or generation of stitched images. The processor may include several processors located at various locations. Each of the several processors may be configured to perform a function that is separate from the function of the other processors, or the processors may cooperate to perform a single function. In particular, a processor may be located on, or be associated with, video camera platform 10.

Figure 2:
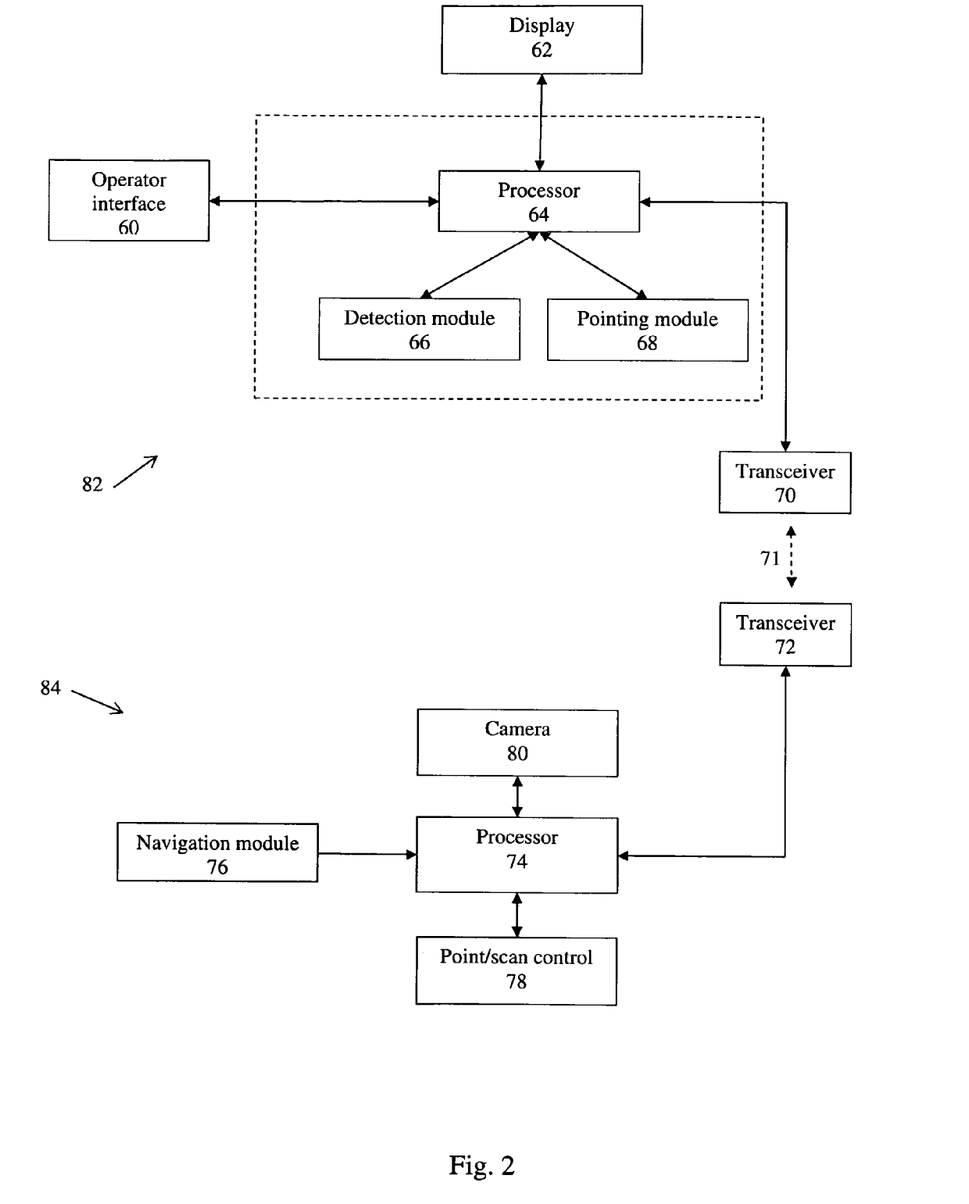
FIG. 2 is a block diagram of an automatic video surveillance system in accordance with embodiments of the present invention.

FIG. 2 is a block diagram of an automatic video surveillance system in accordance with embodiments of the present invention. Operator station 82 communicates with video camera platform 84. Communication takes place through station transceiver 70, connected to station processor 64, and platform transceiver 72, connected to platform processor 74. Communications link 71 between station transceiver 70 and platform transceiver 72 may be wireless or wired, depending on the nature of video camera platform 84. An operator may input instructions to station processor 64 via operator interface 60. The operator may also receive information from station processor 64 via operator interface 60. Station processor 64 operates in accordance with programmed instructions and input provided by the operator via operator interface 60. Station processor 64 includes pointing module 68 and detection module 66. Pointing module 68 and detection module 66 may include blocks of software in the programmed instructions of station processor 64. Alternatively, pointing module 68 or detection module 66 may include specialized hardware components that communicate with station processor 64. Alternatively, all or part of the hardware or software components of pointing module 68 or detection module 66 may be located on video camera platform 84, or at another location.

Pointing module 68 calculates, on the basis of data communicated from video camera platform 84, input provided by the operator via operator interface 60, and programmed instructions, the direction in which to point one or more video cameras that are mounted on video camera platform 84. Pointing module 68 may also calculate a scanning pattern for one or more video cameras that are mounted on video camera platform 84. Data communicated from video camera platform may include location, motion, and orientation data generated by navigation module 76. Data communicated from video camera platform may also include information regarding the current orientation of the LOS of video cameras that is generated by camera point/scan control 78. Upon calculating a direction in which to point the video camera, the results of the calculation are communicated by station processor 64 to platform processor 74. Platform processor 74 then issues the appropriate instructions to point/scan control 78 to cause point/scan control 78 to point the LOS of the video camera in the desired direction. When required, the issued instructions may cause point/scan control 78 to scan the LOS in accordance with a desired pattern.

Video image data acquired by video camera 80 is transmitted by platform processor 74 to station processor 64. The video image data is then processed by detection module 66. Detection module 66 processes the video image data on the basis of input provided by the operator via operator interface 60 and programmed instructions. The purpose of the processing is to determine whether the video image data contains features that meet predetermined criteria that define an object of interest. In the event that features of the video image data meet the predetermined criteria, station processor 64 may cause the video image data to be displayed on image display 62. In addition, station processor 64 may send an appropriate alert to the operator via operator interface 60.

In accordance with embodiments of the present invention, the displayed image may include a stitched image of an entire region of interest. Such an image may be composed of images of individual imaged scenes that were acquired as the region of interest is scanned. Stitching methods are also known.

Figure 3:
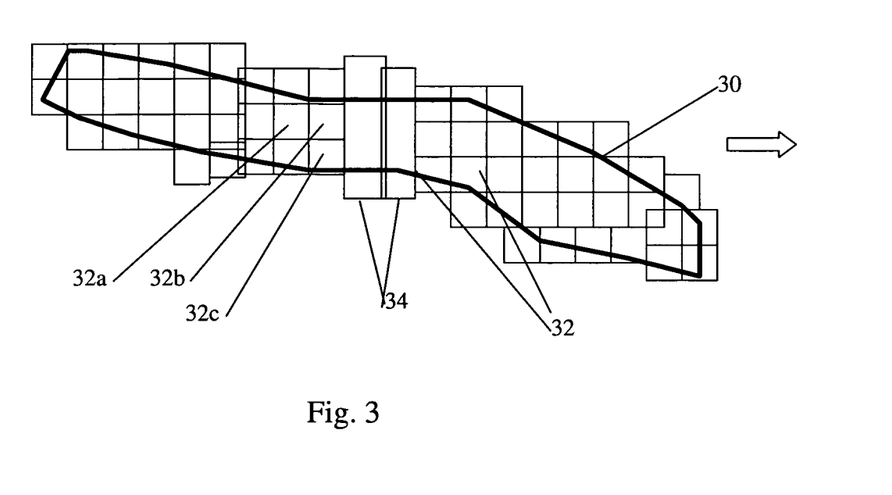
FIG. 3 is a schematic drawing of a monitored geographic region that is larger than the area covered by the field of view of a video camera.

FIG. 3 is a schematic drawing of a geographic region that is larger than a single imaged area. The video camera platform may be positioned relative to geographic region 30 such that the video camera may view any part of geographic region 30 by changing the LOS alone, without displacement of the video camera platform. In this case, the automatic video surveillance system according to embodiments of the present invention can scan geographic region 30 within a relatively short period of time. During the scan, the video camera is scanned so as to point successively at various viewed scenes, represented by the small squares in FIG. 3 such as viewed scenes 32*a*-32*c*, designated collectively as 32. For example, the camera may be scanned along a direction that is perpendicular, or at an oblique angle, to the direction of motion of the platform. In this manner, geographic region 30 may be covered by a series of imaged strips, such as strips 34. The direction of motion of the platform is indicated by the arrow. The widths of strips 34 are sufficiently wide to ensure that each viewed scene 32 has been imaged for a sufficient amount of time. The length of each strip 34 may be limited to viewing angles close to the nadir. An LOS at too large an angle from the nadir (for example, larger than about 45°) may result in an image in which elements in the scene to obstruct one another. In order to image a wide geographic region 30, the platform may have to pass over the region more than once. Viewed scenes 32 may partially overlap one another. When pointed at each viewed scene, the video camera acquires one or more image frames of the viewed scene. At the conclusion of the scan, viewed scenes 32 cover the entire area within the boundaries of geographic region 30. The individually acquired images of the viewed areas are processed to allow registration, and are then combined to construct a single stitched image of geographic region 30. The process of scanning and construction of a single stitched image may be repeated at periodic intervals. As with an individual image, a single stitched image may be processed or operated upon by an automatic detection system in order to detect objects of interest. Stitched images that were acquired and constructed at different times may be compared in order to detect changes in the geographic region.

Parameters defining the geographic region 30 may be input by the operator. Input parameters define the boundaries of region 30. In embodiments of the present invention, the boundaries of the geographic region may be defined graphically on a graphic representation of the vicinity of the region, such as a displayed map. Alternatively, the boundaries may be defined by means of coordinates input as numerical data. Other input parameters may include the frequency with which the region is to be scanned, and parameters that define features to be detected by of the automatic detection system.

A scan region may be defined to cover an elongated geographic feature, such as a section of a road, a wall, a river, or a border. Geographic region 30 is an example of such an elongated geographic feature. In this case, the scan region may be sufficiently defined by coordinates of points along the long dimension of the region and the width of the region. Alternatively, in the event that a representation of the linear geographic feature already exists in the system, it may be sufficient to define the end points and the width of the region.

Once the geographic region is defined, the automatic video surveillance system according to embodiments of the present invention determines how to point the video camera LOS and when to acquire individual a video sequence of frames in order that successfully accomplish full coverage of the entire geographical region 30 in an optimal manner. The system may perform a registration operation on acquired images. For example, the system may convert the acquired video data to an orthophotograph. The registration operation compensates for differences in perspective, range, and platform motion from frame to frame. The registration enables assembly, or stitching of the individual frames into a single, essentially seamless, stitched image of the scan region. This stitched image may be displayed to the operator.

The single seamless image of the scan region that is formed from the assembly of individual image frames has a resolution equal to that of each individual image frame. Ordinarily, to create a wide-angle image of a scene, either the distance between the video camera and the imaged scene is increased, or the effective focal length of the video camera lens is decreased. In either case, the resolution of the image, i.e. the minimum size of a feature of the scene that may be distinguished in the image, is degraded. The method of assembling individual high-resolution frames into a single stitched image, in essence, creates a high-resolution wide-angle image of the scan region.

As is the case with individual image frames, stitched images acquired at different times may be compared with one another to assist in the detection of slow movement or other slow changes in the imaged geographic region.

Figure 4:
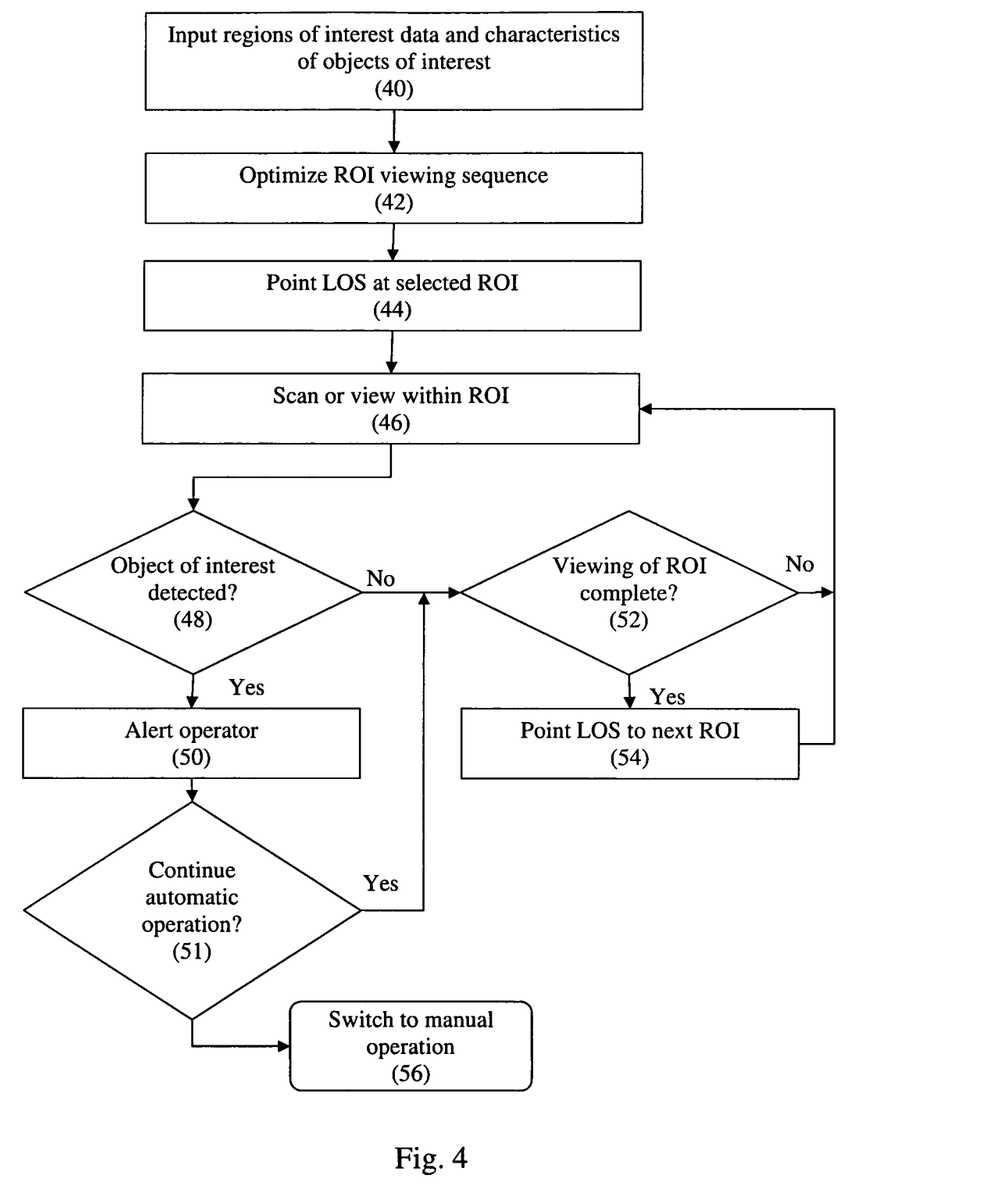
FIG. 4 is a flowchart of a method for automatic video surveillance, in accordance with embodiments of the present invention.

FIG. 4 is a flow chart of a method for automatic video surveillance, in accordance with embodiments of the present invention. Reference is also made to components illustrated in FIG. 1. Data is input into the system (step 40). The input data defines the geographical area to be monitored, including regions of interest (ROI) within the monitored area. Additional data may further provide parameters that affect the manner of viewing the monitored area and regions of interest. Such data may include, for example, coordinates of the ROI, indications of the importance of monitoring each ROI, and optimization criteria. In addition, data is entered that characterizes the nature of objects of interest, or other features that are to be detected by an automatic detection system associated with the automatic video camera-pointing system. In the case of a mobile video camera platform, data may be entered regarding the planned route of the platform. Input data may be entered by an operator via a remote control console, or may be selected from data stored in the memory of the system.

On the basis of the input data, the automatic video surveillance system generates an optimized sequence in which to view the various ROIs (step 42). In the event that the ROI is larger than the FOV of the video camera, the automatic video surveillance system also generates an optimized scanning pattern for scanning within the ROI. A scanning pattern may be parameterized, for example, by a scanning direction and a scanning width. The optimized scanning pattern enables the automatic video surveillance system to scan the ROI in an optimum manner. The optimized sequence and pattern define the directions in which the LOS of the video camera is pointed, and when they are pointed.

The video camera is then pointed at the first ROI selected in accordance with the generated sequence (step 44). The video camera views the ROI by acquiring a series of image frames of the scene. When the ROI is larger than the video camera FOV, the video camera FOV is scanned across the ROI (step 46). The acquired image frames are processed by the automatic detection system, using such tools as VMD. The automatic detection system searches for objects of interest and features that match the criteria that were input during step 40 (step 48). At this point, the system may perform other types of image processing, such as creation of a stitched image. In the event that an object of interest is detected, the operator is alerted (step 50). An image containing that shows the object of interest is displayed for viewing by the operator. At this point, depending on the programmed instructions or input criteria, or on the actions of the operator (step 51), the automatic video surveillance system may halt automatic operation (step 56) until instructed to continue by the operator. Otherwise, the automatic video surveillance system may continue operation (from step 52).

When no object of interest has been detected, the automatic video surveillance system continues to operate (step 52). The video camera continues to view or scan the ROI, to process the acquired image frames, and to continue searching for objects of interest (return to step 46). When the ROI has been viewed or scanned sufficiently, as determined by the input criteria, the automatic video surveillance system points the video camera at the next ROI in the optimized sequence (step 54). The ROI is then viewed or scanned, and the acquired image frames are processed (return to step 46).

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for automatic surveillance of a monitored area via an aerial vehicle, the method comprising:
   receiving region of interest (ROI) data indicative of spatial location of regions of interest in a scene;
   receiving object of interest (OOI) data indicative of characteristics of one or more objects potentially situated within the scene;
   calculating a repeated sequence of lines of sight (LOS) of a video imaging device, wherein the calculating of the sequence is carried out by weighting: the OOI data; properties of the video imaging device; and properties of the aerial vehicle,
   automatically pointing the video imaging device at the scene based on the calculated repeated sequence of LOS;
   applying automatic feature detection algorithms to the video images of the regions of interest, based on OOI data;
   issuing an alert upon detection of the one or more objects in the scene that are associated with the OOI data,
   wherein the characteristics comprise at least one of: visual features, tempo spatial behavior, and location within the scene.

2. A method as claimed in claim 1, wherein the automatically determined order of viewing is optimized.

3. A method as claimed in claim 1, wherein the step of automatically scanning the selected region of interest to detect said one or more characteristics of the object of interest comprises video motion detection.

4. A method as claimed in claim 1, wherein the step of automatically scanning the selected region of interest to detect said one or more characteristics of the object of interest comprises constructing a stitched image of the region of interest.

5. A method as claimed in claim 1, wherein said one or more characteristics of the object of interest is selected from a group of object characteristics which consists of: shape, dimensions, texture, color, luminance, orientation, location, relative location to other known objects, detection of motion, direction of motion and speed.

6. A method as claimed in claim 1, wherein the alert is selected from a group of alerts that consists of: displaying a still image of the detected object, pointing the line of site of the imaging device at the object of interest, marking the detected object on a displayed image, providing an indication to an operator, providing information.

7. A method as claimed in claim 1, wherein the imaging device is mounted on an elevated platform.

8. A method as claimed in claim 7, wherein the platform comprises a platform selected from a group of platforms consisting of an unmanned aerial vehicle, a manned aircraft, a tower, a post, a tethered balloon.

9. A method as claimed in claim 7, wherein the step of automatically scanning the selected region of interest is performed on the platform.

10. An apparatus for automatic surveillance of a monitored area, the apparatus comprising:
an aerial vehicle-mounted video imaging device connected to a pointing mechanism;
a processor; and
a user interface,
wherein the user interface is configured to: (i) receive region of interest (ROI) data indicative of spatial location of regions of interest in a scene; and (ii) receive object of interest (OOI) data indicative of characteristics of one or more objects potentially situated within the scene;
wherein the processor is configured to calculate a repeated sequence of lines of sight (LOS) of a video imaging device, wherein the calculating of the sequence is carried out by weighting: the OOI data properties of the video imaging device; and properties of the mobile platform;
wherein said pointing mechanism is configured to automatically point the video imaging device at the scene based on the calculated sequence of LOS;
wherein the a processor is further configured to: (i) apply automatic feature detection algorithms to the video images of the one or more regions of interest, based on OOI data; and (ii) issue an alert upon detection of the one or more objects in the scene that are associated with the OOI data;
wherein the characteristics comprise at least one of: visual features, tempo spatial behavior, and location within the scene.

11. An apparatus as claimed in claim 10, wherein the automatically determined order of viewing is optimized.

12. An apparatus as claimed in claim 10, wherein the imaging device comprises a video camera.

13. An apparatus as claimed in claim 10, wherein the processor is adapted to automatically scan the selected region of interest to detect said one or more characteristics of the object of interest using video motion detection.

14. An apparatus as claimed in claim 10, wherein the processor is adapted to construct a stitched image of the region of interest.

15. An apparatus as claimed in claim 10, wherein said one or more characteristics of the object of interest is selected from a group of object characteristics which consists of: shape, dimensions, texture, color, luminance, orientation, location, relative location to other known objects, detection of motion, direction of motion and speed.

16. An apparatus as claimed in claim 10, wherein the alert is selected from a group of alerts that consists of: displaying a still image of the detected object, pointing the line of site of the imaging device at the object of interest, marking the detected object on a displayed image, providing an indication to an operator, providing information.

17. An apparatus as claimed in claim 10, wherein the imaging device is mounted on an elevated platform.

18. An apparatus as claimed in claim 17, wherein the platform comprises a platform selected from a group of platforms consisting of an unmanned aerial vehicle, a manned aircraft, a tower, a post and a tethered balloon.

19. An apparatus as claimed in claim 17, wherein a component of the processor that is adapted to automatically scan the selected region of interest to detect said one or more characteristics of the object of interest and upon detection issue an alert is mounted on the platform.

20. The system according to claim 10, wherein the calculating of the sequence by the processor further includes allocating a corresponding period of time for viewing a respective ROI and a frequency at which the respective ROI is to be revisited.

21. The system according to claim 20, wherein the video imaging device has an adjustable field of view (FOV), wherein the FOV is adjusted in real time based on the OOI and the ROI data.

* * * * *